June 16, 1931.  J. LENHART  1,810,357
ELECTRICALLY DRIVEN LAWN MOWER
Filed Oct. 21, 1930
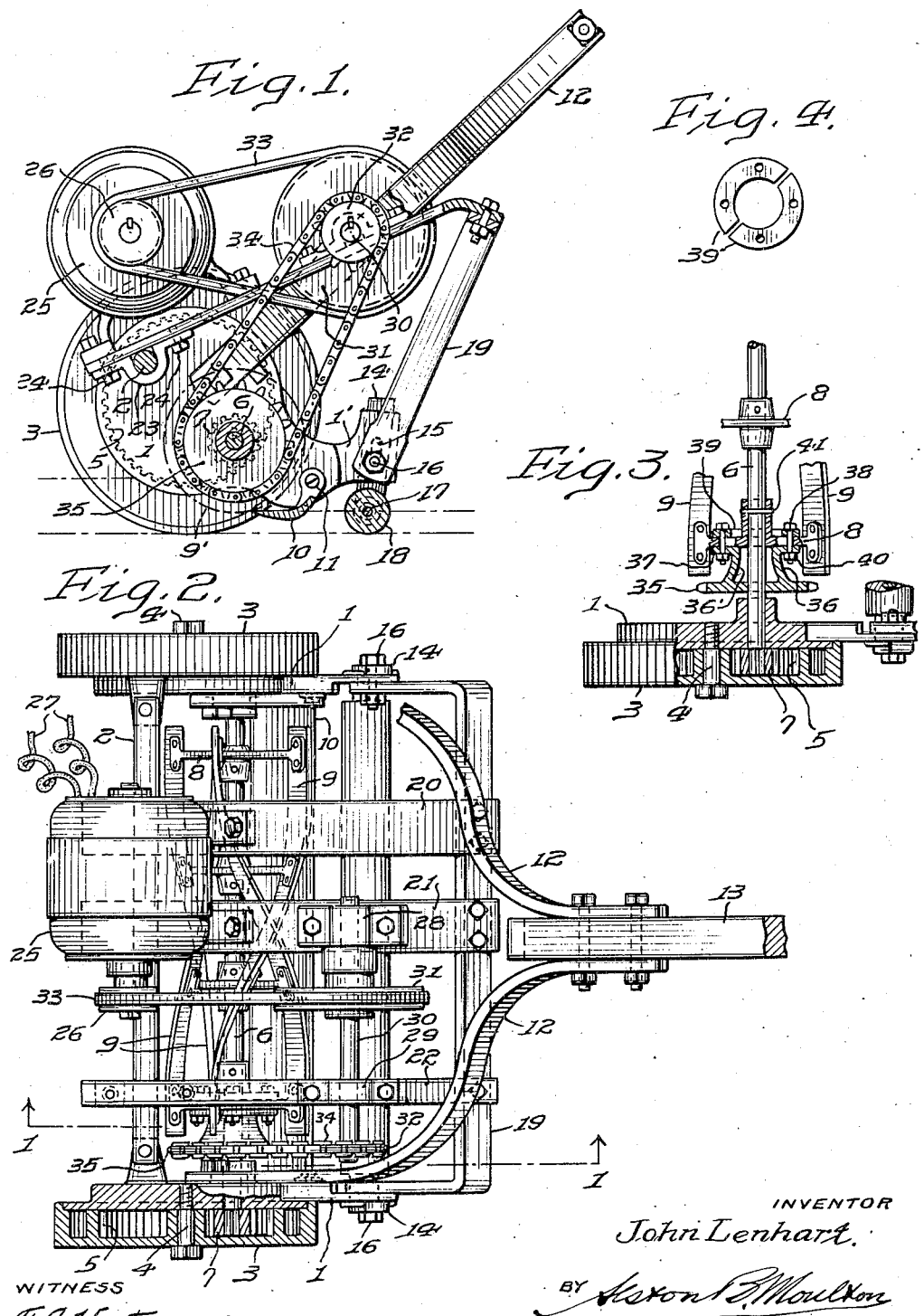
INVENTOR
John Lenhart.
BY
ATTORNEY
WITNESS
F. J. Hartman.

Patented June 16, 1931

1,810,357

UNITED STATES PATENT OFFICE

JOHN LENHART, OF RICHBORO, PENNSYLVANIA

ELECTRICALLY DRIVEN LAWN MOWER

Application filed October 21, 1930. Serial No. 490,112.

My invention relates to lawn mowers which are driven by an electric motor mounted on the framework thereof and more particularly to the construction wherein a lawn mower of the ordinary type designed and intended to be manually pushed by the operator may be provided with an electric motor, and a frame therefor, together with power transmitting mechanism, effective to rotate the cuttter and propel the mower without substantially altering or marring the original lawn mower construction.

A further object of my invention is to provide a simple motor mechanism which can be easily mounted on a lawn mower of usual construction and operated by electric power through a long connection to a source of electrical energy.

A further object of my invention is to provide an electric motor drive for a man propelled lawn mower which may be easily removed from the said man propelled lawn mower when desired to restore said mower to its original condition.

A further object of my invention is to provide a power transmitting means between an electric motor and the rotating blades of a lawn mower operative to slip and yield should the blade encounter a stick or similar obstruction and be prevented from rotation, thereby to prevent a breakage to the machine and to relieve the electric motor of excessive loads tending to unduly heat the same.

A further object of my invention is to provide a lawn mower with an electric motor so mounted thereon that the weight thereof is supported on the wheels of the mower and not on the handle.

A further object of my invention is to provide a lawn mower with an electric motor for propelling the same and for sharpening the blades.

Further objects of my invention will appear in the specification and claims below.

Referring to the drawings forming a part of this specification and in which the same reference characters are used throughout the various views to designate the same parts, Fig. 1 is a vertical sectional view on the line 1—1 of Fig. 2, of a lawn mower equipped with my invention.

Fig. 2 is a plan view of the mower shown in Fig. 1.

Fig. 3 is a fragmentary detailed view of the lawn mower wheel, its mounting, the adjacent end of the rotating cutter blades, the spider on which the ends of the rotating cutter blades are mounted, and the manner in which my driving sprocket is rigidly secured to said spider.

Fig. 4 is a plan view of the clamping ring preferably used in securing the sprocket to the spider.

The lawn mower shown in the drawings comprises a framework consisting of two, generally circular frame castings 1, 1, which, in structure, are complemental to each other, having rearwardly extending ends 1', said castings being connected together by a tie rod 2 extending between the circular portion of the side frame castings 1. Concentric with the circular frames 1 are the wheels 3 mounted to rotate on the studs 4, the wheels being provided with internal gear teeth 5.

Journaled in the side castings 1 is the cutter blade shaft 6, one or both ends of which are provided, outside of the side castings, through which said shaft extends, with a pinion 7 in mesh with the internal gear 5. On the shaft 6 is a series of spiders 8 rigidly secured to the shaft, each spider comprising a series of arms extending generally radially from the axis of the shaft 6, on the free ends of which are rigidly secured the rotatable cutter blades 9. The blades themselves are omitted in Fig. 1, but the path of their cutting edges is indicated by the circle 9' in dot-and-dash lines.

Also mounted on the side castings 1 and extending between them is the stationary cutter blade 10 pivotally mounted on studs 11 and which may be provided with the usual adjustments (not shown) for setting the forwardly extending knife edge thereof in cutting relationship with path 9' of the rotating blades 9.

The yoke members 12, 12 of the handle 13 are secured to the inner sides of the side castings 1 for limited pivotal movement in the usual manner.

On the outer sides of the rearwardly extending ends 1' of the side plates or castings are brackets 14, one for each side, each bracket being provided with a slot 15. A bolt 16 passing through the ends 1' and through said slot provides means for a vertically adjusting of the bracket with respect to the frame or casting. In the lower ends of said brackets is journaled a shaft 17 carrying the usual roller 18. It is upon this roller 18 and the wheels 3 that the lawn mower is supported on the ground. The mower may be and preferably is provided with the usual click mechanism, (not shown) to disengage the cutter shaft 6 from driving relationship with the gears or wheels 4 when the mower, as a whole, is drawn rearwardly.

Against the inner sides of the rearwardly extending ends 1' by the bolt 16 I secure the lower ends of a frame 19 which is preferably in the shape of an inverted U and preferably inclined rearwardly slightly at its upper end, as clearly shown in Fig. 1. To this frame member or yoke 19 I rigidly bolt the rear ends of three flat bars 20, 21, 22, the forward ends of said bars being fixedly secured to the tie rod 2 by straps or brackets 23 (one for each bar), on the undersides of said bars and encircling said tie rod. Bolts 24, passing through the ends of said straps draw the forward ends of said bars tightly against the upper sides of said tie rods. Rigidly mounted on the upper sides of the bars 20 and 21 and preferably a little forward of the axes of the wheels 3 is an electric motor 25 preferably provided with a belt pulley 26, comprising the driving pulley of the motor. Power is supplied to the motor by a multiple strand long flexible cord 27 adapted to be connected to any source of electrical energy.

Mounted on the upper sides of the bars 21 and 22 in bearings 28 and 29 is a countershaft 30 having rigidly secured thereto a grooved belt pulley 31 and a sprocket wheel 32. A belt 33, preferably circular in cross-section, transmits the power of the motor from the belt pulley 26 to the grooved pulley 31 on the countershaft 30, which is also provided with a sprocket wheel 32. Power is transmitted from the sprocket wheel 32 through the sprocket chain 34 to the sprocket wheel 35 which is secured in fixed relationship to the cutter blade shaft 6 to rotate the same.

In this manner the weight of the motor and of the countershaft and pulleys is all borne by the framework 19, 20, 21 and 22 and is transmitted directly to the frame of the mower and the center of gravity of the weight of the propelling mechanism is preferably substantially vertically over the axes of the wheels 3 so that the propelling mechanism does not tend to tip the lawn mower forwardly on the axes 4 of the wheels 3.

The yoke members 12 should be long enough to clear the pulley 31 and the ends of the yoke members 12 are pivotally connected to the frame members 1 of the mower in the usual manner for limited motion around said pivotal connections as a center.

To drive the cutter blade shaft 6 by the sprocket wheel 35 and at the same time not to disturb the mechanism of the machine operative to drive the cutter blades from the wheels 3 when the motor is pushed by manpower, I provide the sprocket wheel 35 with an integral hub 36 with a large opening 36' therethrough and terminating in a flange 37 adapted to rest flat against the outer sides of the arms of the spider 6 which is nearest the ends of the blades, and I securely clamp this flange 37 to the spider by bolts 38 passing through a split ring 39, through the spaces between the arms of the spider and through suitable holes in the flange 37, the bolts 38 being provided with nuts 40 as clearly shown in Fig. 3. From the foregoing it will now be seen that all that it is necessary to do in order to convert a man-pushed lawn mower into an electrically driven lawn mower, by the practice of my invention, is to remove from the lawn mower one (or both) of the side frame castings 1 in the usual way and to slip over the end of the cutter blade shaft 6, the sprocket wheel 35 inserting the split ring 39 in between the blades 9 and passing the bolts 38 through the rings 39 and through the spaces between the arms of the spider 8 through the flange 37 of the sprocket wheel 35 and tighten the nuts 40 thereon. In this way it is easy to secure the sprocket wheel concentric with the axis of the shaft 6 and rigidly to the spider 8 which in turn is rigidly secured to the shaft as by a key-pin 41 in the usual way. The side member or casting 1 is then replaced and the wheel 3 which was removed in taking down the machine, is again secured in place as before by the stud 4, with the teeth of the internal gear 5 in mesh with the pinion 7.

I then secure a yoke or U-shaped frame 19 to the inner sides of the rearwardly extending portions 1' by the bolts 16 and secure to the upper side of the yoke 19 the three bars 20, 21 and 22 and strap them firmly to the front tie rod 2. On the bars 20 and 21 I then mount the motor 25 and the countershaft 30 connecting the pulleys 26 and 31 by the belt 33 and the sprocket wheel 32 with the sprocket wheel 35 by the sprocket chain 34. The machine is now adapted to be electrically motor driven upon the connection of the cord 27 with a source of electric energy.

When power is thus applied to the motor 25 the pulley 26 drives the countershaft through the pulley 33 and belt pulley 31 and in turn power is transmitted through the countershaft to the rotating cutter blade through the sprocket wheel 33, chain 34, sprocket wheel 35 and spider 8. The rotation of the cutter blade shaft in the manner above described rotates the pinion 7 in driving relationship therewith and the rotation of this pinion meshing with the teeth of the internal gear propels the wheels 3 forwardly.

In this manner the electric motor drives the rotating blades 9 and also impels the lawn mower forwardly through the pinion 7 and gear 5 on the inside of the wheels 3 and it is merely necessary for the operator to control the direction of the travel of the lawn mower by steering with the handle 13. It is to be understood that, of course, the flexible electric cord 27 may be provided with a suitable switch conveniently located to enable the operator to control the current at will.

I have found the best results to be attained when I use a relatively high speed electric motor 25. The speed at which the pulley 26 revolves is too high to be transmitted directly to the cutter blade shaft 6. To reduce the speed to one suitable for propelling the mower, the countershaft and driving connections thereto constitutes a simple and effective way of attaining the desired reduction in speed, but this also provides a means for protecting the motor and the mechanism as a whole from injury should the rotating blades 9 encounter a stick or anything which would suddenly stop the rotation of the blades. Were the driving connection between the motor and the rotating cutter blade shaft 6 a rigid connection, such as is attained by the use of gear or sprocket wheels and chains, a sudden stoppage of the rotation of the blades would produce a severe shock on all the faster rotating parts of the power transmitting mechanism and would throw instantly a too severe load upon the motor. By making the driving connection between the motor and the countershaft a yielding belt transmission and the connection between the countershaft and the cutter blade shaft a rigid sprocket wheel and chain drive, I am able to provide a positive transmission of power from the countershaft to the cutter blade shaft where the driving parts are liable to be covered with an accumulation of probably cut slippery grass and to make the driving mechanism between the motor and the countershaft a yieldable or slidable driving connection of such a character that the pulley 26 may readily slip with respect to the belt 33 should the rotation of the cutter blades be accidently suddenly stopped. This yielding drive between the motor and the countershaft is well above and out of the way of the ends of grass which may fly from the mower, in operation, and might interfere with the transmission of power to the countershaft.

The belt drive 33 offers a further advantage. When the cutter blades become dulled from use, it is merely necessary to cross the belt 33 between the pulleys 26 and 31 and apply power to the motor to drive the blades in the opposite direction to that at which they rotate in cutting the lawn and to hold (or adjust) the stationary blade 10 to bear firmly against the edges of the rotating blades with the result that in an exceedingly short time the blades are sharpened and the machine kept in firstclass condition without removing the blades from the machine.

Having thus described my invention, what I claim and desire to protect by Letters Patent of the United States is:

1. In a motor driven lawn mower, the combination with a mower frame, driving wheels therefor, a cutter blade shaft geared to one of said wheels, a spider, and cutter blades carried thereby, said spider being secured to said shaft near the ends of said cutter blades, of a sprocket wheel having an opening for the free passage of said shaft therethrough and terminating in a radially extending flange fitting against the outer side of said spider, an annular member insertable between said blades and adapted to lie flat against the inner side of said spider and bolts passing through said ring and freely through said spider and into said flange to clamp said sprocket rigidly to the outer side of said spider, a rigid framework secured to said mower frame and extending above said cutter blades, a motor mounted on said framework, a countershaft mounted on said framework, a yielding power transmission between said motor and said countershaft and a positive power transmission between said countershaft and said sprocket wheel on said spider, whereby the power of the aforesaid motor is transmitted to the cutter shaft to rotate the same and the cutter shaft drives said wheel to propel the mower forwardly.

2. In a motor driven lawn mower, the combination with a mower frame, driving wheels therefor, a cutter blade shaft geared to one of said wheels, a spider, and cutter blades carried thereby, said spider being secured to said shaft near the ends of said cutter blades, of a sprocket wheel having an opening for the free passage of said shaft therethrough and terminating in a radially extending flange fitting against the outer side of said spider, an annular member insertable between said blades and adapted to lie flat against the inner side of said spider and bolts passing through said ring and freely through said spider and into said flange to clamp said sprocket rigidly to the outer side of said spider, a rigid framework secured to said mower frame and extending above said cutter blades, a motor mounted on said framework and having a driving pulley, a countershaft mounted on said framework, a belt drive between said motor and said countershaft and permitting the said motor pulley to slip with respect to said belt if the rotating of the cutter blades is suddenly stopped, and a positive power transmission between said countershaft and said sprocket wheel on said spider, whereby the power of the aforesaid motor is transmitted to the cutter shaft to rotate the same, the cutter shaft drives said wheel to propel the mower forwardly and the motor is protected from overload.

3. In a motor driven lawn mower, the combination with a mower frame, driving wheels therefor, a cutter blade shaft geared to one of said wheels, a spider, and cutter blades carried thereby, said spider being secured to said shaft near the ends of said cutter blades, of a sprocket wheel having an opening for the free passage of said shaft therethrough and terminating in a radially extending flange fitting against the outer side of said spider, an annular member insertable between said blades and adapted to lie flat against the inner side of said spider and bolts passing through said ring and freely through said spider and into said flange to clamp said sprocket rigidly to the outer side of said spider, a rigid framework secured to said mower frame and extending above said cutter blades, an electric motor mounted on said framework, a countershaft mounted on said framework, a yielding power transmission between said motor and said countershaft and a positive power transmission between said countershaft and said sprocket wheel on said spider, whereby the power of said electric motor is transmitted to the cutter shaft to rotate the same and the cutter shaft drives said wheel to propel the mower forwardly.

In witness whereof, I have hereunto set my hand this 20th day of October, 1930.

JOHN LENHART.